Patented Aug. 12, 1924.

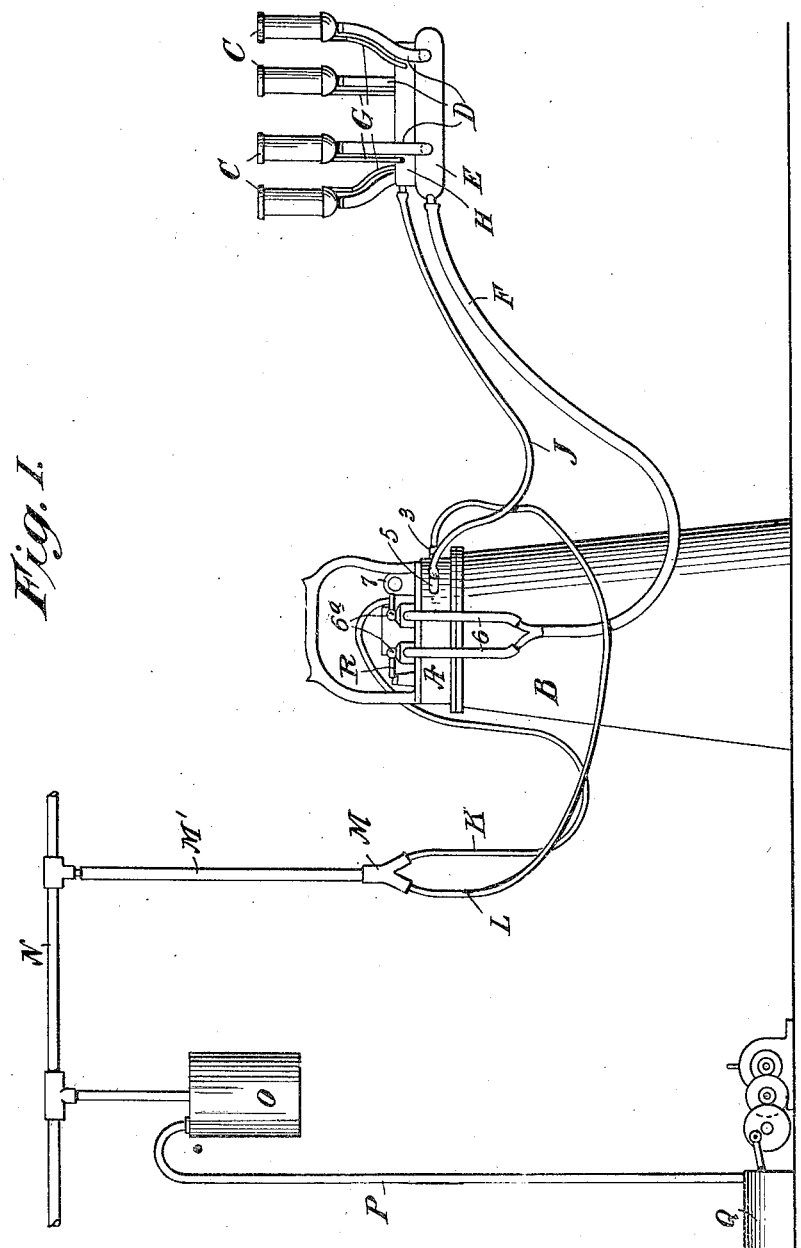

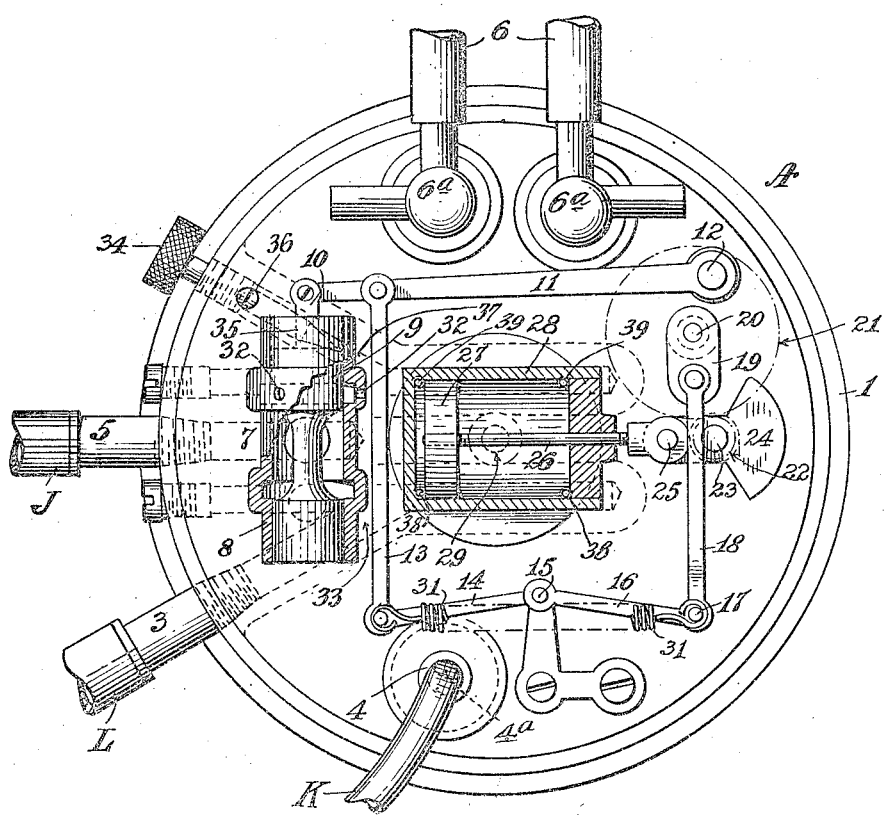

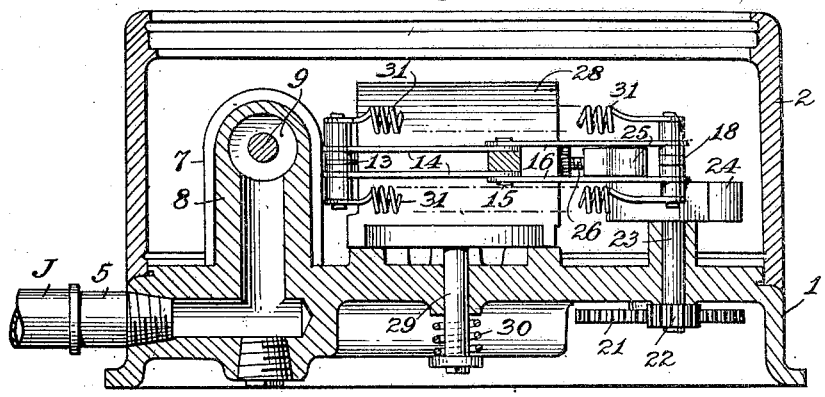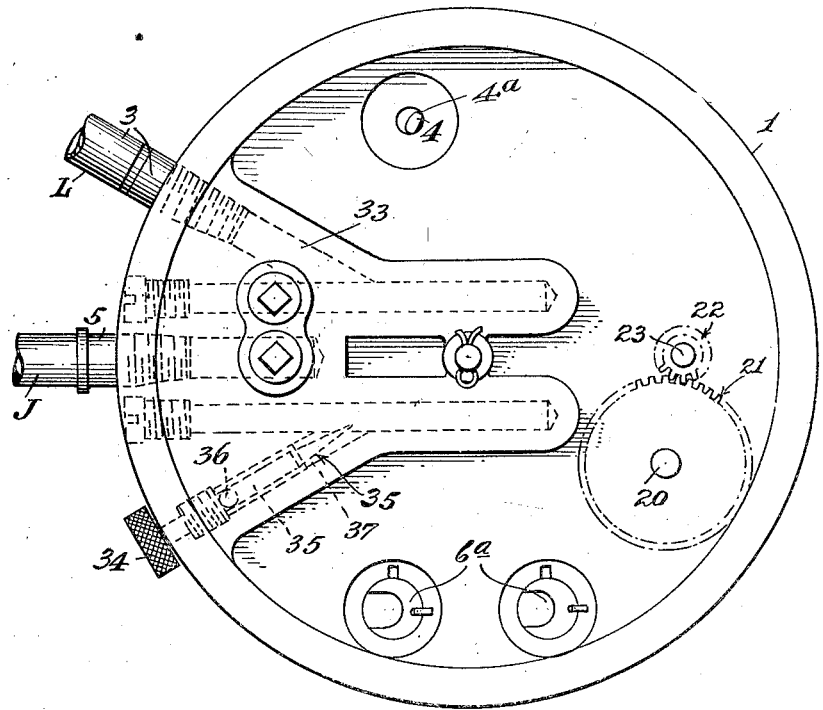

1,504,740

UNITED STATES PATENT OFFICE.

EDWIN DE HAVEN CALDWELL, OF FREDONIA, NEW YORK, ASSIGNOR, BY MESNE ASSIGNMENTS, TO EMPIRE MILKING MACHINE COMPANY, OF BLOOMFIELD, NEW JERSEY, A CORPORATION OF NEW JERSEY.

MILKING-MACHINE PULSATOR.

Application filed August 19, 1920. Serial No. 404,630.

*To all whom it may concern:*

Be it known that I, EDWIN DE HAVEN CALDWELL, a citizen of the United States, residing in the village of Fredonia and county of Chautauqua, State of New York, have invented certain new and useful Improvements in Milking-Machine Pulsators, of which the following is a specification, reference being had to the accompanying drawings, illustrative of one particular embodiment of my invention.

This invention relates to milking apparatus in which suction is used to draw the milk from the cow, and mechanical manipulation is applied in place of manual manipulation of the teats of a cow. More particularly, the manipulation is effected by suitable devices called teat-cups which involve a structure that permits, by the variation of pressure, the teat manipulation desired. The difference in pressures is usually effected by suction or a partial vacuum which is interrupted permitting the normal air pressure to be effective at intervals, or in any event, a variation of pressure.

The changes in pressure effected at the teat-cup, or pulsations must conform to conditions which may vary in different cases, but when predetermined, the action must be reliable and definitely effected in accordance with the condition. This may be broadly referred to as the determination of the timing and amount of pulsations. Generally an approximation of time may accord with the heart beat or pulsations of the cow, and different cows or different breeds of cows giving, as well known, milk of different characteristics, involve different pulsations varying more or less in different breeds above or below forty-five to the minute. It is, however, highly important that the suction drawing the milk shall not continue unless the pulsations continue, or else the drag, that is vacuum pull, will annoy and possibly injure the cow and it is of great importance that the pulsations shall not vary materially during the milking operation, beyond predetermined requirements.

The capacity of the pipe between the apparatus and the teat-cup makes a certain lag in effect, so that the change in pressure is felt at the cup a little after the cutting off of the suction or air at the place of valve control, which, therefore, brings in the question of the valve action as a predominant feature in assuring the desired and proper operation of the pulsation at the cup.

I have, among other things, provided a valve which will cut off the vacuum or admit the normal air pressure to the line extending to the cup, with a constant movement of the valve, so that the result at the cup will be uniform with respect to the cutoff, and I have, furthermore, provided that the valve will be operated at a predetermined time, which may be adjusted, but will be operated so long as there is vacuum pressure in the line and vacuum in the system acting upon the teat sufficient to draw off the milk. Furthermore, the machinery involved in milking machines of necessity results in variations of vacuum, and I avoid the effect of such variations being reflected in the rate of pulsations, by suitable mechanism which will be positive moving so long as there is vacuum or its equivalent, but which mechanism will not vary the rate of pulsation in proportion to the change in vacuum, but on the contrary mechanism is provided whereby the pulsation rate will vary only a small fraction of any variation in the vacuum of the line. With these and other objects in view, as will hereinafter appear, I have described in detail one form of embodiment of my invention with reference to the accompanying drawings, in which:

Fig. I is a general layout of the essential parts of a milking machine.

Fig. II is a top view of a can cover showing plan of pulsator parts in detail.

Fig. III is a vertical section of the pulsator parts embodied in a can cover.

Fig. IV is a bottom view of a can cover.

In the general layout, A is the can cover serving as a base for the pulsator mechanism and the various valves, R is a handle therefor, B is the can to receive the milk, C—C are teat-cups each having a milkway D or a tube to conduct the milk from the cup to a manifold E, from which it is carried by a tube or milkway F to the valve on the can cover. To each teat-cup a pipe G leads from the outer teat-cup envelope to a suction manifold H, connected by suction pipe J to the pulsator on top of the can.

A pipe K connects from a valve on the top of the can to effect suction in the can, and a pipe L leads from the base A where it is connected with the pulsator valve. Both K and L lead to connection M and a pipe M' leads to the main vacuum or suction pipe N which may connect through a reservoir, accumulator or equalizing chamber O to a pipe P through which air is drawn by the pump Q to create a suction in the system, the pump being operated by any suitable motor.

The general view does not show the several parts on the same scale, nor the exact arrangement of inlets and outlets from the pulsator can top, such as are shown in the other figures. Fig. I, however, illustrates the preferred form of a milkway leading to the can from a manifold connected with the teat-cups, such milkway being separate from the air or vacuum connection which actuates the pulsation of the teat-cups. This arrangement, as well as the other connections shown in general, affords a preferred and advantageous form of milking machine in which my invention combines convenient, simple and practical control and operation with all the desired facilities for manipulation, cleaning and other functions.

In Figs. II, III and IV, the milk can top A has a base 1, with a housing 2, a vacuum pipe 3,—which connects with L in Fig. I,—and a vacuum connection 4,—which connects with K, Fig. I. Vacuum pipe 5,— which connects with J, Fig. I,—and milkway suction pipes 6—6,—which connect with milkway tube F, Fig. I. The vacuum connection 4 leads through a valve 4$^a$ into the top of the milk can, the valve maintaining the partial vacuum or suction in the can, thereby holding the cover or top firmly onto the can, and the suction becomes effective through the milkway connections 6—6 whenever the valves 6$^a$ are open, in order to suck the milk through the tube F from the manifold E, thereby providing a constant suction at the bottom of the teat-cups by the tubes D forming the milkway.

The vacuum pipe 5 being connected with the suction pipe J and the manifold H and the suction or pulsator pipes G—G to the outer envelope of each teat-cup, provide the connections for suction or vacuum to dilate the inner envelope of the teat-cup. Periodic release of this dilation is effected by permitting normal air pressure at the outer envelope, so that the constant suction through the milkway D causes a contraction of the flexible envelope and the necessary squeeze which effect the intermittent evacuation of milk from the teat.

This intermittent squeeze, resulting from a condition of vacuum and periodic release to normal air pressure between the outer and inner envelope of the teat-cup, is the pulsation which must be regulated in many ways in order to secure the most desirable and the necessary operation of mechanical milking. Its regulation and timing must also involve reliability and coordination with respect to the pull or suction in the milkway.

The regulation of the vacuum and the periodic change from suction to normal air pressure, or the fluctuation or alteration of pressures, are effected by valve 7, in which a casing 8 has a plunger 9 and a stem 10, with a radius arm 11 pivoted at 12 and actuated by a link 13, connected at one end of a toggle or flip lever 14, having a suitable pivot 15, to which pivot a complementary toggle arm 16 connects by pivot 17 with a connecting rod 18 actuated by a crank 19, on a shaft 20, to which is attached on the underside of the base, a gear 21 actuated by a pinion 22 secured to a shaft 23 supported in the base.

The shaft 23 carries a crank 24 with a counterweight, the crank having a crank-pin 25 connected with a piston rod 26 passing through a stuffing box and securely attached to the piston 27,—the stuffing box and piston being members of an oscillating cylinder 28 oscillating on the cylinder-pin 29 which passes through the base 1, and having the spring 30 suitably arranged to hold the cylinder in easy contact with the base forming a valve seat.

Suitable connections from the suction pipe 3 and passage 33 effect a suction through ports 38, 38 in the base for the oscillating cylinder, which register and close with openings in the cylinder so as to create alternately a difference of air pressure at opposite ends of the piston 27. Ports 39, 39 in the base for the cylinder connect with the air passage 37, and register with corresponding openings in the cylinder. In the usual manner of an air motor, there is thus caused the reciprocation of the piston and owing to the connection with crank 24 there is caused an oscillation of the cylinder, thereby effecting the valve movement,—and resulting in the rotation of the shaft 23. The counterweight aids in preventing a dead-centre in the operation or starting of the air motor, and if desired other means may be used to prevent the motor from stopping on a dead-centre at any time.

The moving parts are relatively light, but of sufficient mass to assure regular and constant motion against any resistance that may be involved in mechanism of this sort, owing to varying conditions of lubrication, dust or otherwise,—but a sufficient speed is aimed at in order that the small light parts may in operation involve ample momentum to serve the most essential purposes of reliability and uniformity of operation. The shaft 23 is, therefore, connected by the pinion 22 with a relatively large gear 21, so that the relatively high speed most essential to assure the uninterrupted regular working of the motor is materially reduced and provides a much slower revolution of the crank 19, and thereby imparts to the connecting rod 18 the desired speed of reciprocation corresponding to the number of pulsations per minute which it is desired to effect by the number of throws of the vacuum control valve 7, in order to regulate the pulsations at the teat-cups.

The valve piston 9 is, however, in the preferred form illustrated, not subject to the vacuum or air pressure in the system but positively moved back and forth as a plunger valve, by means of the connecting rod 13 which is actuated by the flip lever 14 of the toggle, subject to the influence of the spring 31. This spring 31 may be in duplicate, the ends of each spring being connected with the pivot 17 at the end of the connecting rod where it joins the reciprocating toggle member and the other end being joined at the pivot between the connecting link 13 and the flip arm 14 of the toggle, in such a manner that when the end of the connecting rod 18 is moved by the crank 19 past the line of centres between the toggle pivot 15 and the outer end of the flip arm toggle member, the spring 31 will immediately throw the flip arm of the toggle its full movement in one direction, which corresponds to the full movement of the air control valve 9. As the crank 19 moves around to its opposite position the reverse movement is effected by the spring 31 by throwing the fly arm of the toggle in the opposite direction,—thereby moving the plunger valve 9 in the opposite direction its full amplitude of motion or throw. By this arrangement the plunger valve 9 moves only when the spring 31 acts and the spring action is constant and causes a uniform or constant plunge of the valve, and thereby uniformly cuts off the vacuum in the valve 7 opening the air connection through the holes 32, and uniformly closes the air connection and connects up the piping to the vacuum or suction in a uniform or constant manner so far as the direct action of the valve is concerned.

As for the time at which each throw of the valve starts, that is subject to the speed of the crank 19 and the oscillating piston, which in turn is subject to the vacuum effecting the motion of the air motor 27,—but the variation of vacuum in the line, effected through the pipe 3, will not have the effect of varying the speed of crank 19 in proportion to the actual variation in vacuum, on account of the substantial reduction in speed between the shafts 20 and 23. As a consequence the time between pulsations will not vary more than a small fraction of the variations that may develop in the vacuum line or suction of the entire system, and in any event the actual throw of the piston will in all cases be subject only to the spring 31 having a predetermined strength, with suitably designed connections, in order that the actual throw and the cutoff and cutin of the vacuum will be constant. While the spring and toggle mechanism assure the throw of the valve 7 in both directions, in some forms I may effect such constant throw in one direction, preferably the positive and constant movement to connect the vacuum, and thereby release the outer envelope of the cup,—and I may embody the means in any suitable way to return the valve, it being important that the release of the outer envelope at the cup be positive in order to prevent a drag or pull beyond the predetermined plan of operation of the machine.

In any event, the provision of a positive movement by means of a spring, as distinguished from relying upon the slight air pressure involved in the degree of vacuum or suction usual in milking devices, makes certain that the valve, which is responsible for the pulsations, shall move without depending upon the uncertainty of air leakage or interference by friction due to the little obstacles that would otherwise occasionally interfere with the movement of the valve. In some forms of my invention, the positive spring actuation valve may be only in one direction, and should the return movement of the valve, that is motion in one direction, depend upon the vacuum, any slight interference on the return movement may be made subject to a correcting effect of the spring action in one direction, in order to restore normal pulsations before their interruption has had any deleterious effect upon the cow's teats.

In view of the length of the suction pipe J and manifold H and vacuum pipes G—G and the space between the outer and inner envelope, there is a predetermined volume of air between the valve and the teat-cup in the pulsator connections which must be evacuated each time the vacuum connection is established by the pulsator valve 7. This results in the release of the teat-cup pressure following a definite period of time after the throw of valve-piston or plunger 9 from air connection to vacuum connection; likewise when the valve is thrown to admit air at ports 32, pressure results at the teat-cup and though very quick it is also subject to the speed of ingress of air through the pulsator pipe connections, depending upon their predetermined volume. If, however, the plunger 9 moves in the valve at varying speed or is subject to slow opening or slow closing, it adds an additional very variable element to effect the time of operation of the pulsations at the teat-cups, and consequently irregularity in the milking and generally unsatisfactory results, which it is one of the aims of my invention to avoid. By assuring positive valve action or quick opening or closing at a constant speed, I gain great advantage in this respect, altho the rate of pulsations may slightly vary.

From practice it has proven desirable with different characteristics of cows, and certain conditions, to have the pulsations between 40 and 52 per minute, and by the proper design of my apparatus this is accomplished, if necessary, with suitable means, such as the adjuster 34 comprising a knurled head and needle valve 35, to regulate the ingress of air through the opening 36 to effect the pressure acting against the vacuum to operate the air motor 27. By this means adjustment to the desired pulsation rate can be effected by any operator depending upon the best conditions for the particular cows that are being milked.

A suitable cover to protect the actuating parts of the mechanism may be added, or the entire mechanism may be embodied in a casing forming the base, and suitable handles for convenient manipulation of the can and top may be provided in any way desired.

Various modifications in form and construction may be made without departing from the spirit of my invention, but what I claim and desire to secure by Letters Patent is:

1. In a milking machine, a source of suction, a suction line and a suitable milking device for attachment to a cow, an intermediate mechanism to control the pulsating of the milking device, means related to said mechanism for interrupting the suction in the line to the milking device and means for operating the same by the variations in air pressure in the line, said means being connected in such a manner that the action of the regulator will vary fractionally with the variation of the suction on the line, and a quick-throw device actuating the pulsator mechanism.

2. A milking machine pulsator adapted to be connected in a vacuum line, comprising a pulsator valve, a quick-throw actuator for said valve, a relatively high speed mechanism actuated by the suction in the line and means whereby the variations in the movement of the pulsator valve are made only a fractional part of the variations in the vacuum of the line.

3. In a milking apparatus, a vacuum pipe line and means to maintain a vacuum therein, connections to the udder to effect a pulsating action by intermittent pressure or vacuum application and release, a pulsating control mechanism including a valve, mechanism to indirectly control the period of inaction of said valve including an engine positively operated by the differences in air pressure to reciprocate at a higher speed than the pulsations, intermediate connections to reduce the speed and a quick-throw device for one-way movement of said valve.

4. In a milking apparatus, a teat-cup pulsator actuated by the variations in the air pressure from the main milk suction line, a control mechanism for said pulsator actuated from the air line at a rate many times the rate of said pulsator and having intermediate connection for regulating the pulsator valve, whereby variations in the air pressure in the line will only fractionally vary the pulsations on the teat-cup.

5. In a milking apparatus, a teat-cup pulsator actuated by the variations in air pressure from the main air line, a control mechanism for said pulsator actuated by devices mainly subject to the vacuum in the main line, said control mechanism and said pulsator being so connected that pulsations with fractional variation compared with the suction changes are assured at the teat-cup so long as the variation of air pressure is effective at the teat-cup.

6. In a milking apparatus, a vacuum line for effecting pulsation in a teat-cup, a valve for said vacuum line having means for effecting constant speed of the valve movement and a device for regulating the time of each movement actuated by a positive air operated motor and reduction gearing.

7. A pulsator for a milking machine including in the air line connected with the teat-cup a cutoff valve, means for effecting the positive and uniform opening and closing movements of the valve, and means for regulating the time between movements including motive parts operating at a speed greatly in excess of the periodicity of the valve movement and whose operation is subject to the plus or minus air pressure in the line.

8. A pulsator for a milking machine interposed between an air line and a teat-cup, comprising a valve controlling the passage of air to or from the teat-cup, said valve having means to effect its positive movement in one direction, and a device for controlling the period between movements actuated by mechanism subject to the air pressure in the line, with regulating means for reducing the periodicity and for quickening the action.

9. A milking machine comprising a milk receptacle, a milkway to draw milk thereto, teat-cups and flexible connections therefrom to the receptacle, connections including a valve in said milkway supported on a can cover, a valve built into the cover and having connections with an air pipe to the teat-cups independent of the milkway, air passages in said can cover to ports and an oscillating air motor pivotally supported on said cover and cooperating with said ports and an air supply pipe in said cover and an adjusting means to regulate the pressure to said air motor and step-down gearing between said motor and the air valve.

10. A pulsator for a milking machine comprising a can cover having a base, an air valve housing integrally formed with said base, an air pipe integrally formed in said base and adapted to be connected to a flexible tube leading to the teat-cups, a driving mechanism controlled by the air pressure supported on said base and operated in conjunction with ports in the base and means operated thereby to control the rate of movement of the valve, said means being supported on the base and means actuated thereby to effect the movement of the valve at a speed independent of its periodicity.

In testimony whereof, I have signed my name to this specification, in the presence of two subscribing witnesses, this 4th day of August 1920.

EDWIN DE HAVEN CALDWELL.

Witnesses:
HERMANN F. CUNTZ,
RAYMOND W. FOLEY.